United States Patent [19]

Evseanko, Jr.

[11] Patent Number: 4,854,789
[45] Date of Patent: Aug. 8, 1989

[54] CUTTING TOOL ASSEMBLY

[75] Inventor: Nicholas Evseanko, Jr., Bayshore, N.Y.

[73] Assignee: NYTD Industries Inc., Ronkonkoma, N.Y.

[21] Appl. No.: 114,120

[22] Filed: Oct. 27, 1987

[51] Int. Cl.$^4$ .................... B23B 27/16; B23B 51/00
[52] U.S. Cl. ........................... 408/125; 408/78; 408/233; 408/713
[58] Field of Search ............ 408/144, 713, 197, 230, 408/224, 225, 239, 239 A, 233, 125, 78; 279/83; 407/40

[56] References Cited

U.S. PATENT DOCUMENTS

| | | | |
|---|---|---|---|
| 492,733 | 2/1893 | Meister | 408/197 X |
| 1,028,562 | 6/1912 | Fogleman . | |
| 1,047,466 | 12/1912 | Wagner | 408/224 |
| 1,221,247 | 4/1917 | Traylor | 408/224 |
| 1,311,406 | 7/1919 | Lapham et al. . | |
| 2,433,127 | 12/1947 | Kinzbach | 279/77 |
| 2,621,548 | 12/1952 | Williams | 408/233 |
| 2,778,252 | 1/1957 | Oxford, Jr. | 408/230 |
| 2,794,468 | 6/1957 | Huxtable . | |
| 3,776,656 | 12/1973 | Benjamin | 408/233 |
| 3,859,700 | 1/1975 | Jilbert | 408/233 X |
| 3,966,350 | 6/1976 | Benjamin | 408/233 |
| 4,047,830 | 9/1977 | Kruger | 408/144 X |
| 4,060,335 | 11/1977 | Holloway et al. | 408/233 |
| 4,120,601 | 10/1978 | Benjamin | 408/226 |
| 4,271,735 | 6/1981 | Denman | 408/239 X |
| 4,325,661 | 4/1982 | Tickins | 408/239 A |
| 4,334,446 | 6/1982 | Field | 408/233 X |
| 4,488,840 | 12/1984 | Pollington | 408/231 |
| 4,493,596 | 1/1985 | Grunsky et al. | 408/713 X |
| 4,509,887 | 4/1985 | Hofling | 408/239 R |

*Primary Examiner*—Z. R. Bilinsky
*Attorney, Agent, or Firm*—Scully, Scott, Murphy & Presser

[57] ABSTRACT

A cutting tool assembly and, more particularly, a novel holding device for cutting tools, especially such as flat beaded drill bits which are employed in the drilling of track rail. A tool holder possessing a generally solid cylindrical construction, having a first cylindrical shank portion is adapted to be fixedly installed in the rotary drive unit of a rail drill, and wherein the tool holder includes a second cylindrical shank portion coaxial with the first shank portion having a tool-mounting projection end. A clamping member extends transversely across a longitudinal slot formed in the second shank portion whereby actuation of the clamping member, such as a screw or the like, will selectively widen or narrow the slot. The shank end of a flat beaded track drill is inserted into the slot, with raised longitudinal beads on the opposite surfaces of the drill bit engaging into complementary longitudinal grooves formed in the facing surfaces of slot in the tool holder.

5 Claims, 4 Drawing Sheets

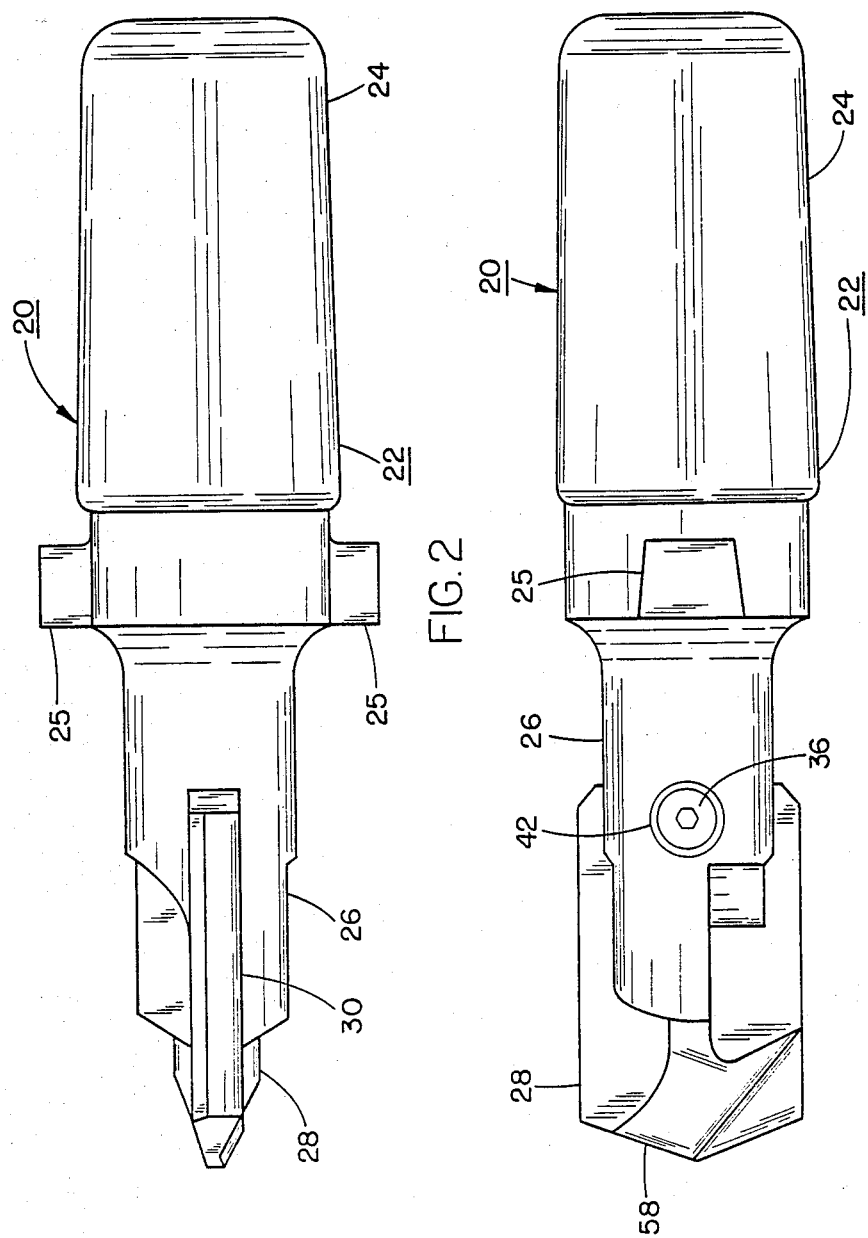

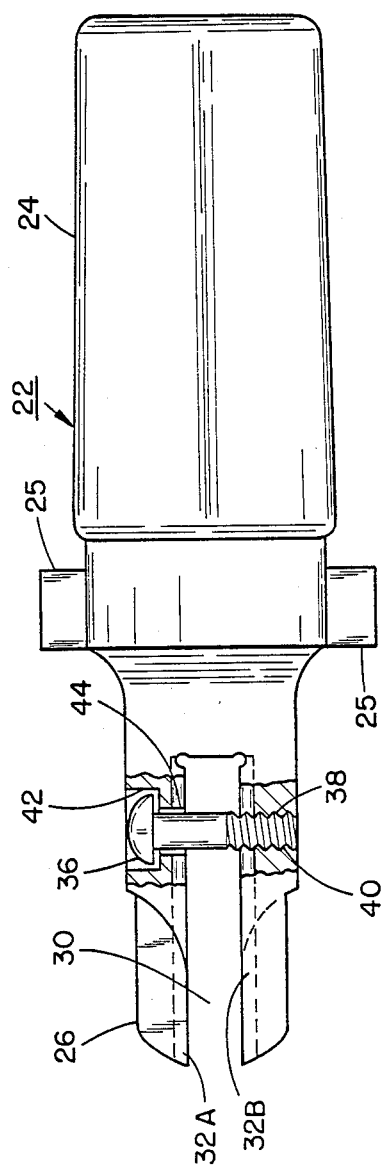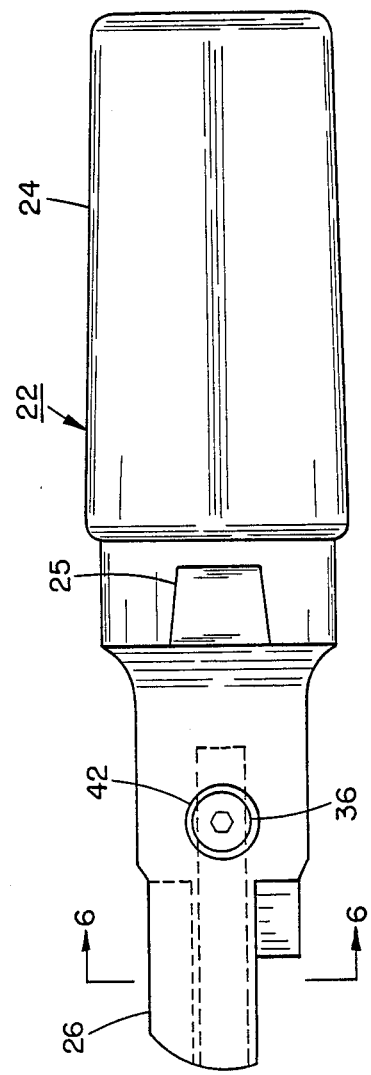

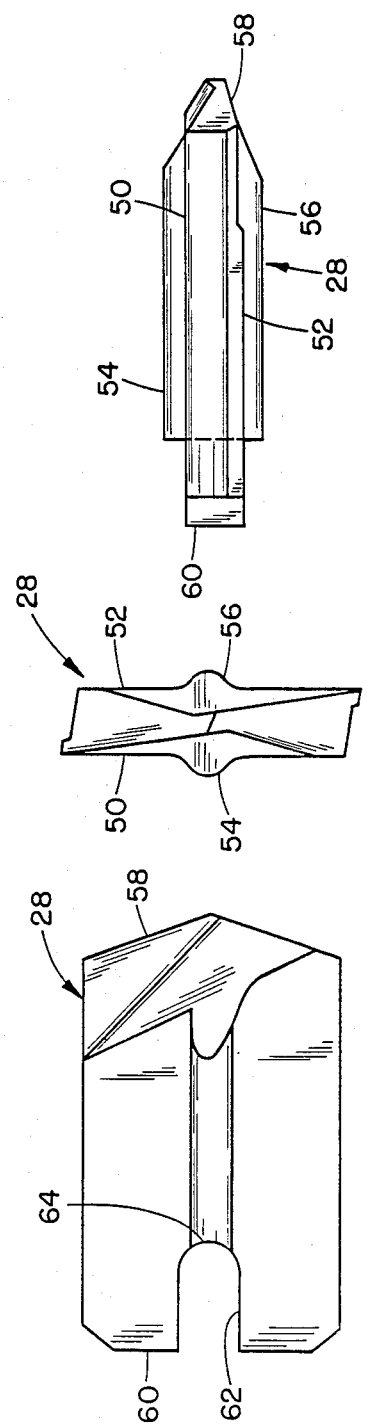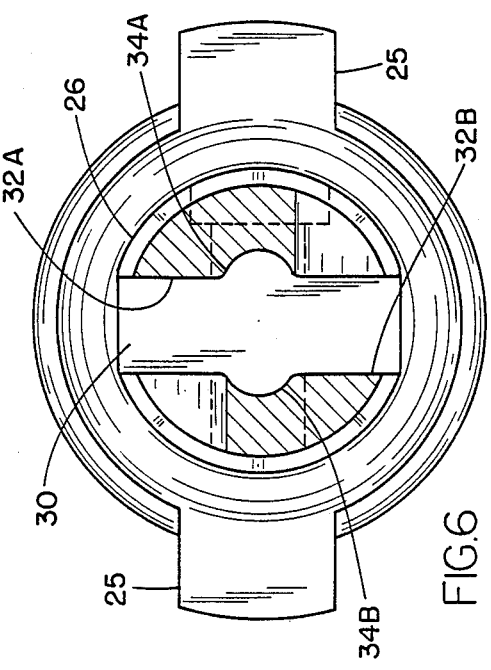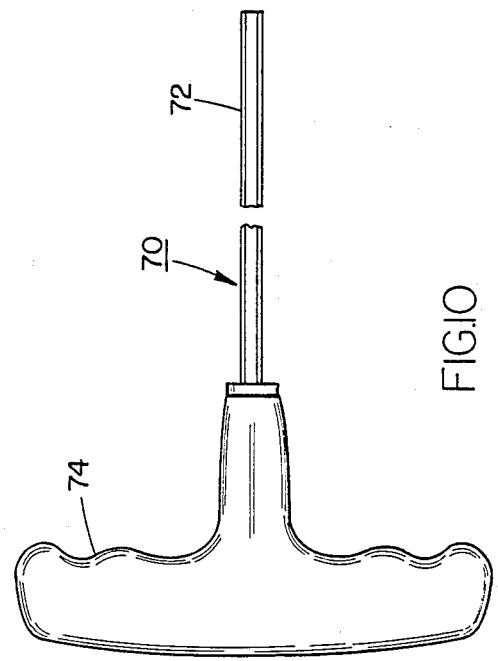

CUTTING TOOL ASSEMBLY

BACKGROUND OF THE INVENTION

1. Field of the Invention

The present invention relates to a cutting tool assembly and, more particularly, relates to a novel holding device for cutting tools, especially such as flat beaded drill bits which are employed in the drilling of track rail.

Over the course of many years, track rail has generally been drilled on site during track-laying operations, in order to enable adjoining sections or lengths of track rail to be bolted together through apertured connecting plates and bolts. Basically, the holes are drilled in the track rails through the intermediary of a hole drilling apparatus which is clamped to the track rail during the drilling operation, and which is well known in this technology as a rail drill, wherein the whole cutting tool, which is constituted of a flat beaded track drill bit, is clamped in a cutting tool holder known as a "Rich Chuck".

2. Discussion of the Prior Art

This particular cutting tool holder is of the general configuration of a solid, cylindrical member which is longitudinally split into two mating halves, each being substantially semi-circular in cross-section. The facing surfaces of the split cylindrical holder are each provided with a central, longitudinally extending groove or recess which, when the track drill bit is inserted therebetween, causes opposite faces on the track drill bit to contact the facing surfaces on the holder, and longitudinal beads provided on the opposite faces of the track drill bit to engage in the respective grooves or recesses in the facing surfaces tool holder halves. Thereafter, the entire cutting tool assembly, constituted of the cutting tool holder and the inserted track drill bit, is hammered into a spindle on the rail drill so as to cause the holder to clampingly engage the track drill bit. The track drill bit, upon insertion into the tool holder, has the cutting end thereof extending for approximately three to six inches, with the projecting end of the track drill bit having cutting surfaces formed thereon for effectuating the drilling of holes through the web of the track rail. The drilling of accurately sized and located holes in track rail with this type of cutting tool assembly employed in current rail drills is subject to a number of drawbacks and disadvantages.

Thus, the considerable unsupported length of tool drill bit projecting axially from the cutting tool holder presently causes the leading cutting end of the drill bit to assume an excessive extent of runout or eccentricity during drilling, inasmuch as even any minor misalignment of the clamped portion of the drill bit between the mating halves of the tool holder due to manufacturing tolerances or caused by the hammering of the holder into the rail drill will result in an extensive runout, possibly up to as much as 0.060 tir, of the drill cutting surfaces.

Moreover, inasmuch as the steel employed for track rail has been considerably improved upon in recent years; for instance, through the provision of harder steels, whereby such track rail is now designated as "Head Hardened Rail", this has dramatically increased the wear on the cutting surfaces of the tool drill bits, necessitating their frequent replacement after the drilling of only relatively few holes in the track rail.

In order to replace such worn tool bits, it is the current practice in rail drills employing the above-mentioned "Rich Chuck" or such similar cutting tool assembly, to hammer the assembly constituted of the tool holder and the drill bit as a unit out of the rail drill, separate the halves of the holder, remove the worn drill bit, insert a new drill bit between the mating halves of the tool holder, and then hammer the entire cutting tool assembly back as a unit into the rail drill. This sequence of installing and replacing the drill bits is extremely time-consuming, while in addition thereto, the need for hammering the entire assembly into and out of the rail drill, not only results in misalignments of the drill, thus causing excessive runout and wear, but may also impart damage to the tool holder and drill bit so as to render these parts unuseable.

Consequently, in order to improve upon currently employed cutting tools for the drilling of, in particular, track rail, the present invention contemplates the provision of an improved cutting tool assembly incorporating a novel flat beaded track drill bit, and a novel holder for the drill bit which will eliminate the necessity for having to remove the tool holder from the rail drill and to then reinsert the holder during each replacement or interchange of drill bits. Moreover, the inventive drill bit can be easily inserted and clamped in the holder, and thereafter withdrawn therefrom through the simple manipulation of a clamping element arranged in the tool holder. There is also effectuated an extensive reduction in the length of the drill bit, resulting in a savings to material, considerably reducing any runout of the cutting end which will ameliorate deleterious effects due to runout or eccentricity which generally causes one of the cutting edges of the drill to assume most of the cutting action, thereby imposing unnecessary strains and stresses on the drill bit and on the tool holder, and consequently considerably enhancing the life expectancy of the components of the cutting tool assembly.

Moreover, eliminating the necessity for the removal and reinsertion of the tool holder in the rail drill during replacements of the drill bit, considerably reduces the "downtime" or servicing time for the rail drill during this sequence of operation.

The advantages obtained by the inventive cutting tool construction for rail drills impart a reduction in the overall length of the drill bit of up to 50% in comparison with present drill bits employed with the "Rich Chuck" for rail drills, while considerably increasing the rigidity and strength of the cutting tool assembly during its drilling operation.

Furthermore, a tightened radius geometry in the bead construction of the inventive track drill bit enables the latter, in combination with being mounted on the inventive tool holder, to run more concentrically within 0.012 max tir, in contrast with a runout in the current state-of-the-art of up to 0.060 max tir, thereby increasing the accuracy of the drilled holes in the track rail.

Although numerous and widely varying types of arrangements and holders are currently known in the technology relating to the mounting of cutting tools, such as drills and the like, these are generally more complex in construction and function, frequently impose undue levels of stresses on the clamped or restrained portions of the cutting tools; and are not particularly suited for use with rail drills.

Williams U.S. Pat. No. 2,621,548 discloses a mounting for cutting tools, in which a generally cylindrical tool holder includes a slotted shank portion extending from a rotary drive mechanism. The slotted shank portion of the tool holder is adapted to receive a spade drill bit having a base portion with a slot formed therein, which extends over a fastening screw extending across the slot in the shank of the tool holder. In this instance, the screw generally extends through an opening formed in the spade drill bit, and upon being tightened to clamp the drill bit in the tool holder, imparts stresses to the drill bit during drilling operation, while also necessitating the complete removal of the screw in order to remove or exchange the spade drill bit.

Pollington U.S. Pat. No. 4,488,840 discloses a rotary cutting tool in which a cutting insert is secured in a slotted portion provided on a cylindrical tool holder, and thereafter soldered thereto in order to securely attach the insert to the holder. This necessitates the insertion and removal of the entire cutting tool assembly constituted of the tool and the holder into a drilling machine, and fails to facilitate for the simple replacement of drill bits in a tool holder as contemplated by the present invention.

Benjamin U.S. Pat. No. 3,776,656 discloses a spade drill bit which is adapted to be inserted into the slot formed in a cylindrical shank portion of a tool holder. A screw extends through the slot and through a hole which is formed in the drill bit, and upon being tightened causes the surfaces of the slot to clampingly engage the spade drill bit. This particular structure fails to provide the necessary precision in inserting a drill bit into the holder and, moreover, necessitates the complete removal of the clamping screw in order to be able to, respectively, insert and remove the drill bit from the tool holder.

Field U.S. Pat. No. 4,334,446 discloses a cutting tool holder having a slotted end for insertion of a triangular cutting tool, including a clamping member in the form of a screw extending across the slot, in which the screw may be tightened or loosened to selectively clamp or release the triangular cutting tool which is inserted in the holder slot towards one side of the clamping screw. This particular structure fails to provide for the precise alignment of a flat beaded track drill in a tool holder slot of the type under consideration herein, and is not readily adaptable for use in rail drills.

SUMMARY OF THE INVENTION

In essence, the inventive cutting tool assembly contemplates the provision of a tool holder possessing a generally solid cylindrical construction, having a first cylindrical shank portion adapted to be fixedly installed in the rotary drive unit of a rail drill, and wherein the tool holder includes a second cylindrical shank portion coaxial with the first shank portion having a tool-mounting projecting end. A clamping member extends transversely across a longitudinal slot formed in the second shank portion whereby actuation of the clamping member, such as a screw or the like, will selectively widen or narrow the slot. The shank end of a flat beaded track drill is inserted into the slot, with raised longitudinal beads on the opposite surfaces of the drill bit engaging into complementary longitudinal grooves formed in the facing surfaces of slot in the tool holder. A longitudinal recess or slot is formed to extend inwardly from the bottom end of the drill bit shank so as to provide bifurcated shank end, such that the recess can pass at a clearance over the transversely extending screw member or fastener in the slot of the tool holder. Consequently, after insertion of the slotted shank end of the drill bit into the slot of the holder, upon tightening of the screw, the beaded portions of the drill bit will be in surface contact with the complementary grooves formed in the facing surfaces of the tool holder slot, and the drill bit is rigidly clamped in the holder in an accurately aligned manner. The portion of the cutting tool or drill bit projecting from the slotted end of the tool holder need only be of a length of about 1 to 1⅛ in., thereby considerably shortening the length of the drill bit, particularly the unsupported shank portion thereof, and thereby considerably reducing any potential eccentricities or runout of the cutting end of the drill bit. In order to be able to replace a worn drill bit, it is merely necessary to loosen the clamping element or screw extending through the tool holder slot, without the need for completely removing such clamping element, slide the tool bit out of the slot in the holder, insert a new tool bit into the holder slot, and thereafter merely tighten the screw member with a suitable hand tool provided for this purpose.

Accordingly, it is an object of the present invention to provide an improved cutting tool assembly which is particularly adapted for rail drills, and which facilitates the rapid and efficient insertion and replacement of cutting tools, such as drill bits, into a tool holder.

A further object of the invention is to provide a cutting tool assembly of the type under consideration herein, in which the cutting tool, such as a flat beaded track drill, may be readily inserted and/or replaced in a tool holder for a rail drill without necessitating the removal of the tool holder from the rail drill.

Still another object of the present invention is to provide for an arrangement for the inserting and replacement of a cutting tool, such as a flat beaded track drill, in a slotted tool holder which is mounted on a rail drill, and in which the simple tightening of a clamping element on the holder, such as a screw, will accurately fasten the drill bit in the tool holder or loosening of the clamping element allows the drill bit to be removed from the holder.

BRIEF DESCRIPTION OF THE DRAWINGS

Reference may now be had to the following detailed description of an exemplary embodiment of a cutting tool assembly pursuant to the invention, taken in conjunction with the accompanying drawings; in which:

FIG. 2 illustrates a side view of a cutting tool assembly pursuant to the invention, constituted of a tool holder and a drill bit mounted thereon;

FIG. 3 illustrates a top plan view of the cutting tool assembly of FIG. 2;

FIG. 4 illustrates a side view of the cutting tool holder, shown partly in section;

FIG. 5 illustrates a top plan view of a cutting tool holder of FIG. 4;

FIG. 6 illustrates, on an enlarged scale, a sectional end view of the cutting tool holder taken along line 6—6 in FIG. 5;

FIG. 7 illustrates a top plan view of the track drill bit pursuant to the invention; FIG. 8 illustrates an end view of the track drill bit shown from the cutting edge thereof;

FIG. 9 illustrates a side view of the track drill bit; and

FIG. 10 illustrates a hand-operated tool adapted for selectively tightening or loosening the drill bit in the tool holder.

DETAILED DESCRIPTION

Figure 1:
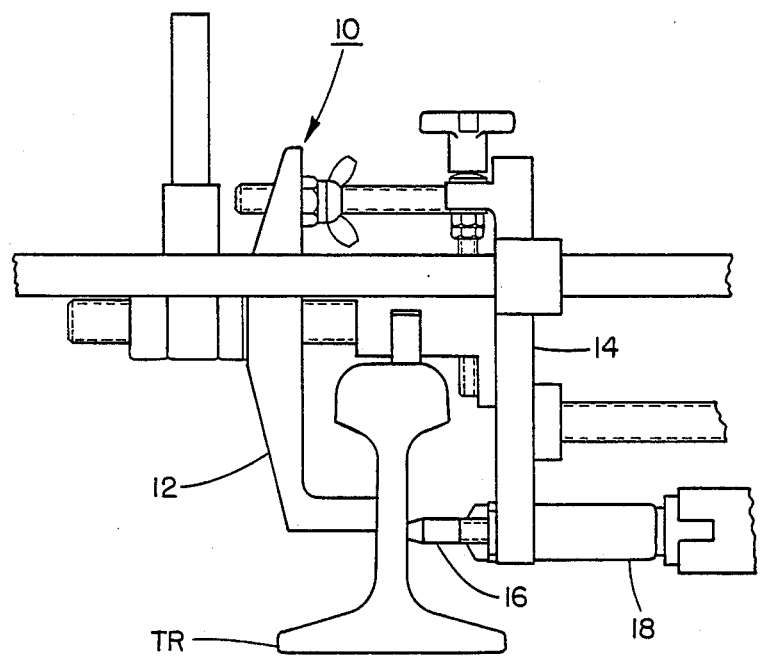
FIG. 1 is a generally schematic side elevational view through a portion of a rail drill, shown in the process of drilling holes through the web of a track rail.

Referring now in detail to the drawings, FIG. 1 generally schematically illustrates a portion of a rotary drilling machine 10; in essence, a rail drill, which is adapted to drill holes through the webs of suitable track rails TR, usually during the joining of track sections in track-laying operations. For example, a rail drill of the type which may be utilized in conjunction with the present invention is, manufactured and commercialized by Racine Railroad Products, Inc., Racine, Wis., referred to in this technology as a "Racine Rail Drill". Similar rail drills with which the present invention may be employed are also manufactured and sold by Modern Track Machinery, Inc., Elgin, Ill.; Fairmont Hydraulics, Fairmount, Minn.: and Nordberg Inc., Milwaukee, Wis. In that instance, the rail drill is fastened to the end portion of a length of track rail TR through the intermediary of a suitable clamping device incorporating clamps 12 and a cooperating clamping plate 14 mounting clamping screws 16 so as to align a rail drilling or cutting tool arrangement 18 in a predetermined position normal to the orientation of the upstanding web portion of the track rail TR. Although only one cutting tool arrangement 18 is illustrated, quite apparently there may be provided a number of such arrangements on the rail drill 10 to enable the simultaneous drilling of a plurality of predetermined spaced holes in the web of the track rail TR.

In essence, the inventive cutting tool assembly 20 for the drilling of holes into track rail, referring in particular to FIGS. 2 and 3 of the drawings, provides for a generally cylindrical tool holder 22, which includes a slightly tapered, solid cylindrical main body or first shank portion 24 which is adapted to be fixedly inserted into the rotary drive unit (not shown) of the rail drill 10, such as by being hammered into the rail drill through the intermediary of a hammering tool acting on radially protruding lugs 25 formed at one end of the holder portion 24. A second sold cylindrical holder shank portion 26 coaxial with holder portion 24, extends from the side of the lugs 25, and is adapted to mount a cutting tool 28, such as a flat beaded track drill bit, as described in more extensive detail hereinbelow.

The cylindrical shank portion 26 of the tool holder 20 for receiving a drill bit 28 as shown in FIGS. 4, 5 and 6 of the drawings, has a slot 30 cut through the end which is distant from shank portion 24, the slot 30, as shown in detail in FIG. 6, being of a predetermined width defined by the parallel-extending facing planar surfaces 32A and 32B, extending to a predetermined depth into the cylindrical portion 26 of the tool holder 20 for the insertion of the drill bit 28.

In each of the respective facing surfaces 32A and 32B of the slot 30 there are centrally formed longitudinal grooves 34A and 34B, of substantially semi-circular cross-section, which extend over substantially the full depth of the slot 30.

A clamping element 36, in the form of a socket-head setscrew, extends transversely and centrally across the slot 30 with a threaded portion 38 of the screw being threadingly engaged in a threaded bore 40 formed in one portion of the cylindrical holder section 26; for instance, in the shank portion containing groove 32B, while the head end of the screw is adapted to be received in a recess 42 and its shank extends through a smooth bore 44 formed in the opposite side containing the groove 32A. Consequently, any tightening of the screw 36 will slightly narrow the width of the gap 30, whereas loosening the screw, without necessitating any complete disengagement between threads 38, 40, will cause the slot 30 to widen due to the inherent resilience of the metal of the holder.

Referring specifically to FIGS. 7 through 9 of the drawings, there is shown the inventive cutting tool 28, which is essentially an improvement upon a flat beaded track bit as produced by the assignee of the present application. In this instance, the flat beaded track drill 28 possesses substantially parallel planar wall surfaces 50 and 52, each of which incorporates a raised continuous bead 54, 56 of generally hemi-spherical cross-section extending along substantially the longitudinal centerline of each surface.

The end of the shank of the flat beaded track drill 28, opposite its leading cutting edge 58, in essence at the end 60 which i adapted to be inserted into the slot 30 of the tool holder shank portion 26, is provided with a central recess 62 in the form of an elongate slot having a generally rounded bottom 64, which recess 62 is of a width and depth adapted to pass with a clearance over the screw 36 extending across the slot 30.

When the drill bit 28 is to be inserted into the tool holder 20, the end 60 thereof is inserted into the end of the slot 30 with the beads 54 and 56 being inserted in the rsspective grooves 34A and 34B in surfaces 32A, 32B, while the screw 36 is in a loosened position imparting a maximum width to the slot 30, until the end 60 of the tool bit 28 contacts against the bottom of the slot 30. The recess or elongate slot 62 in the drill bit 28 is of a sufficient width to permit the sides thereof to pass the shank portion of the screw 36 extending across slot 30 with a clearance. The beads 54 and 56 are dimensioned to provide a closely-fitted engagement with the longitudinal grooves 34A, 34B in the surfaces 32A, 32B of the slot 30, such as to accurately align the drill bit 28 in the slot 30 and with respect to the longitudinal axis of the tool holder 20. Thereafter, tightening of the screw 36 will cause the surfaces of the grooves 34A, 34B to clampingly contact the respective beads 54 and 56 on the drill bit surfaces 50, 52 so as to firmly align and restrain the drill bit 28 in the tool holder 20.

The tightening of the screw 36, for imparting the clamping action on the drill bit 28 in the slot 30 of the tool holder 20, may be effectuated through the intermediary of an elongate hand tool 70, as shown in FIG. 10 of the drawings. The tool possesses a steel shaft 72 having a cross-sectional configuration, at least at its free end, in conformance with the shape of a recess in the head portion of the screw 36, i.e. hexagonal or square, and with a gripping handle 74 attached thereto enabling the hand tool 34 to be turned to impart a tightening action to the screw 36 or, alternatively, allow for the loosening thereof.

The cutting end 58 of the drill bit 28 need only extend or overhang a distance of about 1 to 1⅛ in. from the slotted end of the tool holder 20, thereby considerably reducing any possible extent of runout during drilling operations, and producing more accurately-sized and spaced holes in the web of the track rail TR.

In order to replace a drill bit 28 presently mounted in the tool holder 20 with another drill bit, it is merely necessary to loosen the screw 36 by means of the hand tool 74, slide out the currently inserted drill bit 28, insert a new drill bit into slot 30, as described hereinbefore, and thereafter tighten the screw 36. In effecting the foregoing, there is no necessity for removing the tool holder 20 from the rail drill 10, as would be the case in the current state-of-the-art, thereby considerably reducing any "downtime" in the operation of the rail drill 10, while avoiding any possible damage to the tool holder, drill bit, and to the spindle of the rail drill mounting the tool holder, which could result in runout of the drill.

From the foregoing, it is readily apparent that the invention is directed to a simple construction affording a considerable reduction in the cost of the drill bit, while concurrently drastically reducing the amount of time required for exchanging of drill bits, while avoiding damage to the overall drilling equipment.

While there has been shown and described what is considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A cutting tool assembly, particularly for rail drills utilized for the drilling of holes through track rail; comprising; in combination; a generally cylindrical solid tool holder having a first end fastened in a rotary drive of said rail drill; a longitudinally extending slot being formed in a second end of said holder; clamping means extending transversely through said slot for selectively narrowing the width of said slot responsive to actuation of said clamping means; a cutting tool having a shank portion insertable into said slot for mounting said cutting tool on said holder, said clamping means fastening said cutting tool to said holder upon tightening of said clamping means, said slot having longitudinally extending groove means formed in facing surfaces of said slot, said shank portion of the cutting tool having opposite flat surfaces extendable into said slot in close surface proximity to the facing surfaces of said slot; and longitudinally extending beads being formed on said opposite flat surfaces of said cutting tool shank portion, said beads extending into said groove means in closely-fitted surface contact therewith, said clamping means including a screw member having a threaded screw portion threadingly engaged with a threaded bore in said cutting tool shank portion on one side of said slot remote from the head of said screw member, whereby tightening of said clamping means causes said cutting tool to be precisely aligned relative to the tool holder and minimize run out of said cutting tool during drilling operations.

2. A cutting tool assembly as claimed in claim 1, wherein a longitudinally extending recess is formed in the end of said cutting tool shank portion which is inserted into said slot so as to form a bifurcated shank portion straddling said clamping means at a clearnace therewith.

3. A cutting tool assembly as claimed in claim 1, wherein said cutting tool comprises a flat beaded track drill bit.

4. A cutting tool assembly as claimed in claim 4, wherein said recesses comprises an elongate slot formed in said cutting tool shank portion.

5. A cutting tool assembly as claimed in claim 1, wherein said cutting tool projects between about 1 to 1½ inches from said second end of the cutting tool holder.

* * * * *